(12) United States Patent
Hughes et al.

(10) Patent No.: US 8,297,478 B2
(45) Date of Patent: Oct. 30, 2012

(54) POWDER FEED CYLINDER ASSEMBLIES AND POWDER FEEDERS

(75) Inventors: Thomas Malcolm Hughes, Greer, SC (US); James Brown, Lyman, SC (US); Vincent Papotto, Pelzer, SC (US); Phil Roark, Simpsonvile, SC (US)

(73) Assignee: Honeywell International Inc., Morristown, NJ (US)

( * ) Notice: Subject to any disclaimer, the term of this patent is extended or adjusted under 35 U.S.C. 154(b) by 1029 days.

(21) Appl. No.: 12/241,438

(22) Filed: Sep. 30, 2008

(65) Prior Publication Data

US 2010/0078411 A1 Apr. 1, 2010

(51) Int. Cl.
*B65D 88/54* (2006.01)
*G01F 11/00* (2006.01)
*G01F 11/20* (2006.01)
*B65G 47/00* (2006.01)

(52) U.S. Cl. ......... 222/331; 222/412; 198/525; 198/529

(58) Field of Classification Search .................. 222/412, 222/410, 411, 333, 331; 110/110; 198/525, 198/529
See application file for complete search history.

(56) References Cited

U.S. PATENT DOCUMENTS

| | | | | |
|---|---|---|---|---|
| 2,741,796 | A | * | 4/1956 | King .............................. 222/367 |
| 2,813,704 | A | * | 11/1957 | Mackissic ..................... 366/133 |
| 2,858,011 | A | * | 10/1958 | Wahl ............................. 222/413 |
| 3,252,630 | A | * | 5/1966 | Berg .............................. 222/331 |
| 3,577,849 | A | | 5/1971 | Roberts |
| 3,997,089 | A | | 12/1976 | Clarke et al. |
| 4,300,474 | A | | 11/1981 | Livsey |
| 4,644,127 | A | | 2/1987 | LaRocca |
| 4,884,724 | A | * | 12/1989 | Schmidt ........................ 222/623 |
| 5,038,014 | A | | 8/1991 | Pratt et al. |
| 5,182,430 | A | | 1/1993 | Lagain |
| 5,304,771 | A | | 4/1994 | Griffin et al. |

(Continued)

FOREIGN PATENT DOCUMENTS

WO   WO 9117104 A1 * 11/1991

OTHER PUBLICATIONS

Non-Patent Literature Search Report.*

*Primary Examiner* — Kevin P Shaver
*Assistant Examiner* — Matthew Lembo
(74) *Attorney, Agent, or Firm* — Ingrassia Fisher & Lorenz, P.C.

(57) ABSTRACT

Powder feed cylinder assemblies and powder feeders are provided. A powder feed cylinder assembly includes a cylinder, a bit, and bushings. The cylinder has a main passage, a first feed channel, and a second feed channel, each feed channel at two axial locations between the cylinder's two ends. The bit extends through the main passage and has an outer surface including a helical channel formed thereon. A center bushing is disposed in the main passage between the two axial locations and has a first axially-extending passage through which the bit extends. The first end bushing is disposed in the main passage on one side of the center bushing and has a second axially-extending passage through which the bit extends. The second end bushing is disposed in the cylinder on the other side of the center bushing and has a third axially-extending passage through which the bit extends.

20 Claims, 4 Drawing Sheets

U.S. PATENT DOCUMENTS

| | | |
|---|---|---|
| 5,764,521 A * | 6/1998 | Batchelder et al. ............ 700/196 |
| RE37,911 E * | 11/2002 | Lang ............................. 222/412 |
| 6,582,160 B2 | 6/2003 | Campbell et al. |
| 6,786,362 B2 | 9/2004 | Sisk |
| 6,894,247 B2 | 5/2005 | Renteria et al. |
| 7,009,137 B2 | 3/2006 | Guo |
| 7,038,162 B2 | 5/2006 | Baker et al. |
| 7,250,081 B2 | 7/2007 | Hu et al. |
| 7,358,457 B2 | 4/2008 | Peng et al. |
| 7,748,575 B2 * | 7/2010 | Hanaoka et al. .............. 222/240 |

* cited by examiner

POWDER FEED CYLINDER ASSEMBLIES AND POWDER FEEDERS

TECHNICAL FIELD

The inventive subject matter generally relates to laser welding apparatus, and more particularly relates to powder feeders for use in laser welding apparatus.

BACKGROUND

Metallic articles, such as turbine blades, impellers, and other engine components, may be welded and/or alloyed with various repair alloys. In some cases, the repair alloys may be welded to the component by employing a laser welding apparatus, such as an automated laser cladding system. Typically, an automated laser cladding system includes a laser beam system and a powder feed apparatus. The laser beam system is configured to provide a laser beam and to focus the laser beam at a particular repair surface. The intensity, location, and/or motion of the laser beam may be computer-controlled or manually controlled. The powder feed apparatus may include a powder source and a nozzle that is configured to deliver the powder to a particular location. In some configurations, the nozzle may be directed to substantially the same location of the repair surface as the laser beam.

During repair, the laser beam from the laser beam apparatus melts a relatively small volume of the repair surface to form a molten pool. The powder feed apparatus simultaneously supplies a repair alloy powder from the powder source at a controlled volume into the molten pool. Particles of the repair alloy powder become dispersed throughout the molten pool to thereby alter, complement, and/or add to a composition of the component.

Although the above-described laser welding apparatus are adequate, they may be improved. In particular, the powder feed apparatus of the laser welding apparatus typically includes complex parts, which may become worn over time. As a result, the parts may need to be replaced and/or may need repair. However, because numerous parts make up the powder feed apparatus, the apparatus may be relatively difficult and/or time-consuming to repair. In some cases, repair of a powder feed apparatus may take hours. Consequently, the laser welding apparatus may experience an undesirably long downtime during which component repairs may not be made.

Accordingly, it is desirable to have a powder feed apparatus having a simpler design that conventional powder feed apparatus. In addition, it is desirable for the improved powder feed apparatus to be capable of delivering powder at a substantially uniform and/or constant rate. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

Powder feed cylinder assemblies and powder feeders are provided.

In an embodiment, by way of example only, a powder feed cylinder assembly includes a cylinder, a bit, a center bushing, a first end bushing, and a second end bushing. The cylinder has a first end, a second end, a main passage, a first feed channel, and a second feed channel. The main passage extends axially through the cylinder, the first feed channel is formed radially through the cylinder at a first axial location between the first and the second ends and is in communication with the main passage, and the second feed channel is formed radially through the cylinder at a second axial location between the first and the second ends and is in communication with the main passage. The bit extends through the main passage and has a first end, a second end, and an outer surface, and the outer surface includes a helical channel formed on the outer surface of the bit. The center bushing is disposed in the main passage between the first and second axial locations and has a first axially-extending passage through which a first portion of the bit extends. The first end bushing is disposed in the main passage and has a second axially-extending passage through which a second portion of the bit extends. The first end bushing is disposed on a first side of and spaced apart from the center bushing. The second end bushing is disposed in the cylinder and has a third axially-extending passage through which a third portion of the bit extends. The second end bushing is disposed on a second side of and spaced apart from the center bushing.

In another embodiment, by way of example only, the powder feed cylinder assembly includes a cylinder, a bit, a center bushing, a first powder retention assembly, and a second powder retention assembly. The cylinder has a first end, a second end, a main passage, a first feed channel, and a second feed channel, where the main passage extends axially through the cylinder, the first feed channel is formed radially through the cylinder at a first axial location between the first and the second ends and in communication with the main passage, and the second feed channel is formed radially through the cylinder at a second axial location between the first and the second ends and in communication with the main passage. The bit extends through the cylinder and has a first end, a second end, and an outer surface including a helical channel formed on the outer surface. The center bushing is disposed in the main passage between the first and second axial locations and has a first axially-extending passage through which a first portion of the bit extends. The first powder retention assembly disposed in the main passage on a first side of the center bushing between the center bushing and the first end of the cylinder. The first powder retention assembly includes a first end bushing disposed in the main passage and having a second axially-extending passage through which a second portion of the bit extends, the first end bushing disposed on a first side of and spaced apart from the center bushing, a first fitting disposed in the main passage between the first end of the bit and the first end bushing, the first fitting including a first opening through which a third portion of the bit extends, and a slinger disposed in the main passage between the first end of the bit and the first end bushing. The second powder retention assembly is disposed in the main passage on a second side of the center bushing between the center bushing and the second end of the cylinder. The second powder retention assembly includes a second end bushing disposed in the main passage and having a third axially-extending passage through which a fourth portion of the bit extends, the second end bushing disposed on a second side of and spaced apart from the center bushing, and a second fitting disposed in the main passage between the second end of the bit and the second end bushing, the second fitting including a second opening through which a fifth portion of the bit extends.

In still another embodiment, a powder feeder includes a hopper having an outlet, a powder feed assembly coupled to the hopper, and a powder feed cylinder assembly. The powder feed assembly includes a housing assembly including a connector plate coupled to the hopper, and a housing block coupled to the connector plate. The powder feed cylinder assembly is disposed between the connector plate and the housing block. The powder feed cylinder assembly includes a cylinder having a first end, a second end, a first opening, and a second opening, the first opening formed at a first axial location between the first and the second ends and in communication with the outlet of the hopper, and the second opening formed at a second axial location between the first and the second ends, a bit extending through the cylinder and having a first end, a second end, and an outer surface including a helical channel formed on the outer surface, a center bushing disposed in the cylinder between the first and second axial locations, the center bushing having a first axially-extending passage receiving a first portion of the bit, the first axially-extending passage defined by an inner surface spaced apart from the outer surface of the bit to form a gap, a first end bushing disposed in the cylinder and having a second axially-extending passage receiving a second portion of the bit, the first end bushing disposed on a first side of and spaced apart from the center bushing, and a second end bushing disposed in the cylinder and having a third axially-extending passage receiving a third portion of the bit, the second end bushing disposed on a second side of and spaced apart from the center bushing.

BRIEF DESCRIPTION OF THE DRAWINGS

The inventive subject matter will hereinafter be described in conjunction with the following drawing figures, wherein like numerals denote like elements.

DETAILED DESCRIPTION

The following detailed description is merely exemplary in nature and is not intended to limit the inventive subject matter or the application and uses of the inventive subject matter. Furthermore, there is no intention to be bound by any theory presented in the preceding background or the following detailed description.

Figure 1:
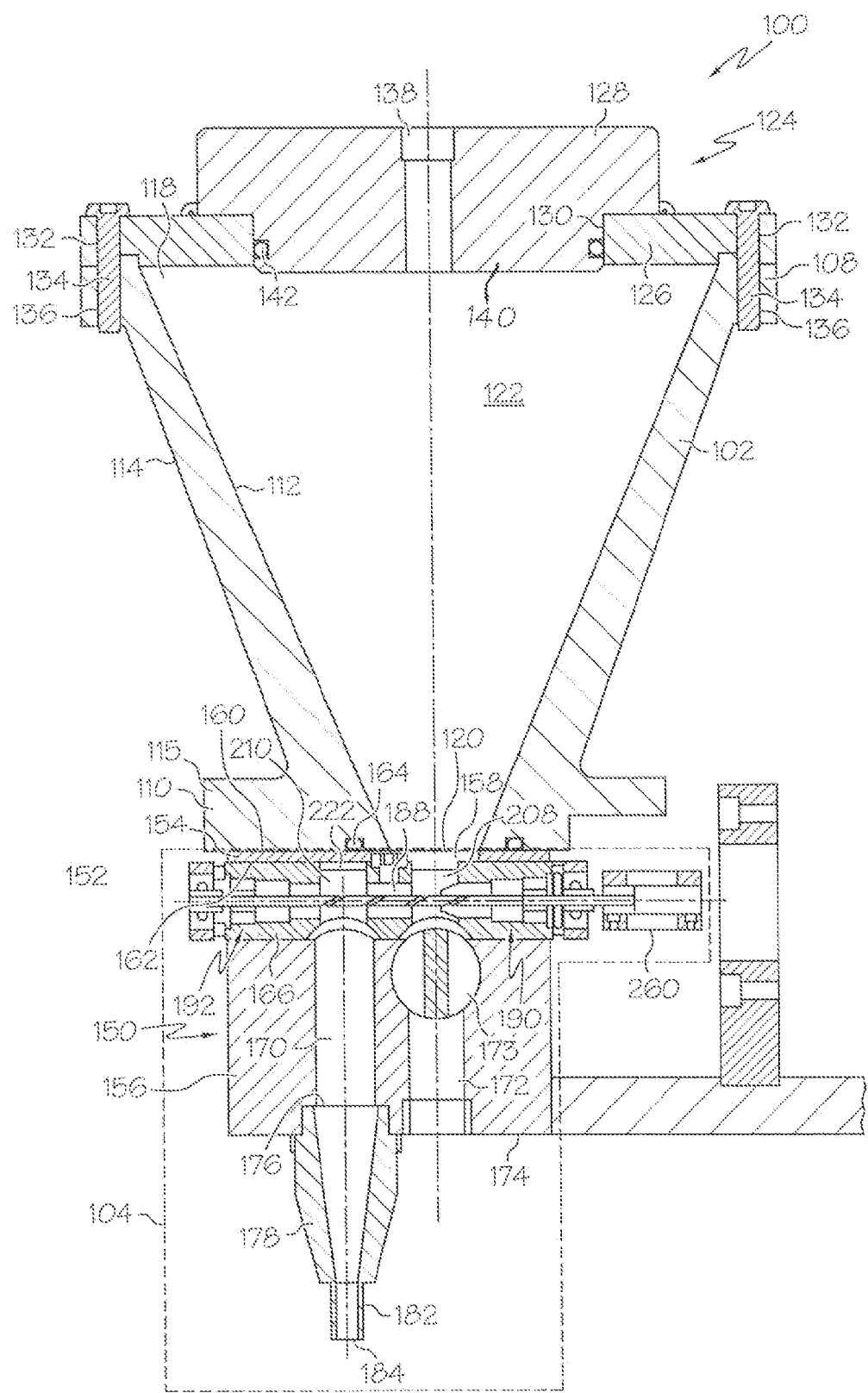
FIG. 1 is a cross-sectional view of a powder feeder, according to an embodiment.

FIG. 1 is a cross-sectional view of a powder feeder 100, according to an embodiment. The powder feeder 100 may be adapted for inclusion into an automated laser cladding system to provide one or more powders to a repair surface during a laser welding process. For example, the one or more powders may include pure metal, alloys, superalloys, mixtures of metals and/or alloys, ceramic, glass, and/or any other powder that is conventionally employed during a laser welding process. In an embodiment, the powder feeder 100 is configured to supply the powder at a substantially constant rate (e.g., within ±0.001 grams per second (g/sec). For example, the powder feeder 100 may be configured to supply the powder at a rate in a range of about 0.03 grams/sec to about 2.5 grams/sec. In another embodiment, the powder may be supplied at a rate that is greater than or less than the aforementioned range.

The powder feeder 100 includes a hopper 102 and a powder feed assembly 104, indicated by dotted box 104, according to an embodiment. The hopper 102 is adapted to receive powder from a powder source (not shown) and to guide the powder to the powder feed assembly 104. In an embodiment, the hopper 102 has a first end 108, a second end 110, an inner surface 112, and an outer surface 114. The first end 108 includes an inlet opening 118, and the second end 110 includes an outlet opening 120. The inner surface 112 of the hopper 102 extends between the inlet opening 118 and the outlet opening 120 to define a cavity 122. To promote powder flow from the inlet opening 118 to the outlet opening 120, the cavity 122 may be funnel-shaped or cone-shaped and may generally have an inlet opening 118 with a diameter that is greater than a diameter of the outlet opening 120. In an embodiment, the diameter of the inlet opening 108 is in a range of from about 4.5 cm to about 5.0 cm, and the diameter of the outlet opening 110 is in a range of from about 0.5 cm to about 1.0 cm. In other embodiments, the diameters of the inlet opening 108 and outlet opening 110 may be greater or less than the aforementioned ranges. The inner surface 112 may be smooth to define a smooth-surfaced cavity 122, according to an embodiment. In another embodiment, the inner surface 112 may be beveled. The outer surface 114 of the hopper 102 may have any shape, depending on a desired footprint of the powder feeder 100. For example, the outer surface 114 may be funnel-shaped, as shown in FIG. 1, or may be cubical, cylindrical, or another shape. In an embodiment in which the outer surface 114 is funnel-shaped, an attachment flange 115 may be included to provide an area for attaching the hopper 102 to the powder feed assembly 104.

To prevent contamination of the powder within the hopper cavity 122, the hopper 102 may include a cover assembly 124, in some embodiments. The cover assembly 124 may include a lid 126 and a cap 128 and may be coupled to the first end 108 of the hopper 102 over the inlet opening 118. In an embodiment, the lid 126 is generally annular and has an outer periphery and a feed opening 130. The outer periphery includes lid fastener openings 132 for receiving fasteners 134 that are inserted through corresponding hopper fastener openings 136 located on the hopper first end 108. The fasteners 134 may be threaded screws, bolts, clamps, or any other device suitable for coupling the lid 126 to the hopper 102. Although two lid and hopper fastener openings 132, 136 and two fasteners 134 are shown in FIG. 1, more may be included in alternate embodiments. For example, eight lid and hopper fastener openings and eight fasteners may be included in other embodiments.

According to an embodiment, the feed opening 130 is dimensioned to allow powder to be easily supplied to the hopper cavity 122. For example, the feed opening 130 may have a diameter in a range of about 2.5 cm to about 3.5 cm. In other embodiments, the feed opening 130 may be larger or smaller. In any case, the feed opening 130 may mate with a projection 140 having corresponding dimensions and extending from the cap 128. The cap 128, which can be used to generally cover the feed opening 130, may also provide a smaller passage 138 through which a supply of powder may be fed. For example, the smaller passage 138 may be adapted to receive tubing or a connector that provides powder from the powder source and may have a diameter in a range of about 0.25 cm to about 0.40 cm. In other embodiments, the smaller passage 138 may be larger or smaller. To prevent powder leakage from the feed opening 130, a seal 142 may be disposed in the feed opening 130 between the cap projection 140 and the lid 126. In an embodiment, the seal 142 may be an O-ring, a gasket, or any other type of seal typically used to seal a space between two surfaces. Although the feed opening 130 and projection 140 may be generally circular in shape, they may have other shapes, such as ovular, square, polygonal, and the like. Additionally, although the lid 126 and the cap 128 are shown as two separate pieces, in other embodiments, the lid 126 and cap 128 may be a single, unitary component that does not include a feed opening or projection.

Figure 2:
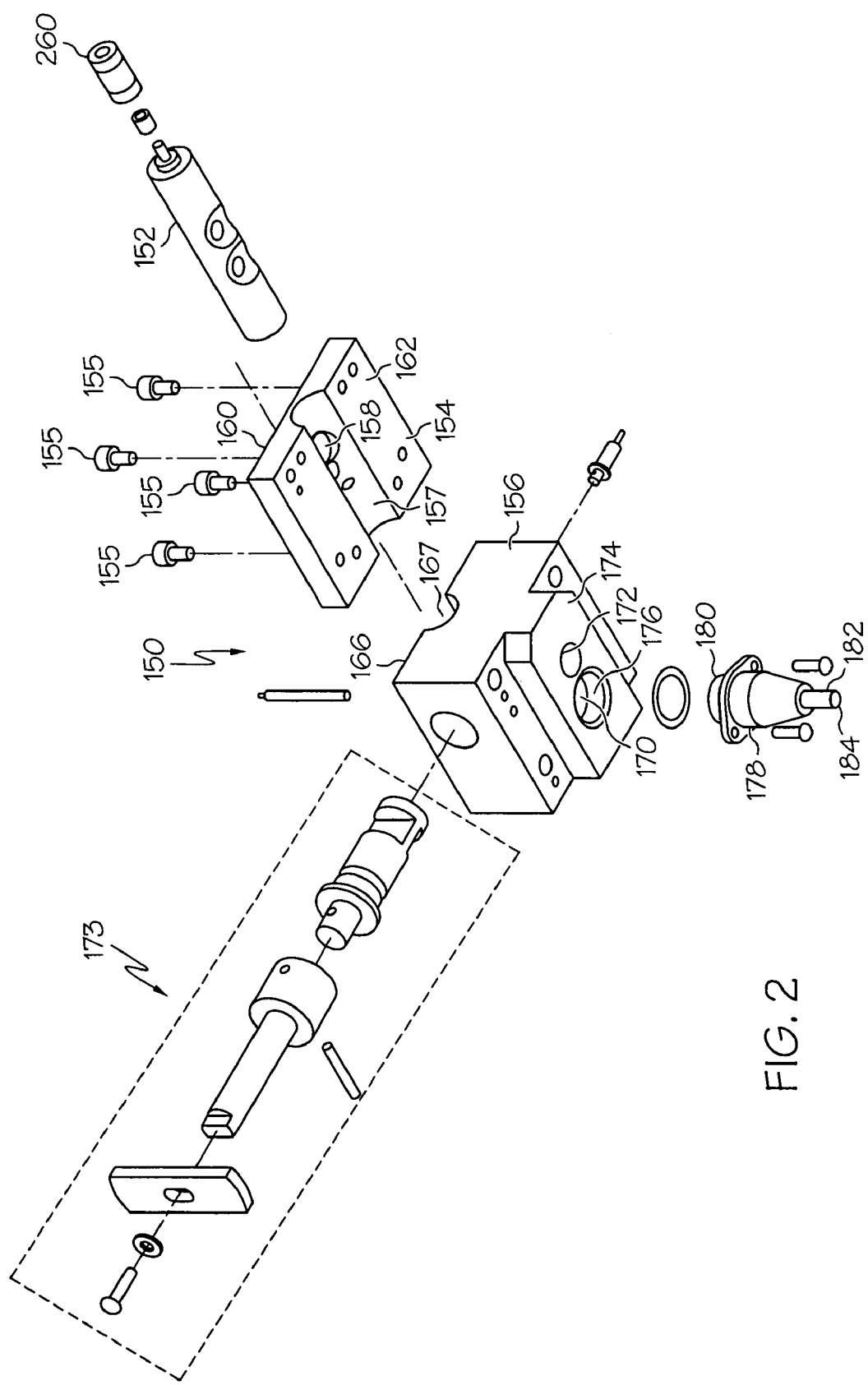
FIG. 2 is a perspective, exploded view of the powder feed assembly of FIG. 1, according to an embodiment.

The powder feed assembly 104 is coupled to the hopper 102. In an embodiment, the powder feed assembly 104 is configured to receive powder from the hopper 102 and to substantially evenly distribute the received powder to a target (not shown) at a desired powder feed rate. FIG. 2 is a perspective, exploded view of the powder feed assembly 104 included in FIG. 1, according to an embodiment. With reference to both FIGS. 1 and 2, the powder feed assembly 104 includes a housing assembly 150 and a powder feed cylinder assembly 152. The housing assembly 150 houses the powder feed cylinder assembly 152 and in this regard, includes a connector plate 154 and a housing block 156, in an embodiment. In particular, the connector plate 154 and the housing block 156 are configured such that the powder feed cylinder assembly 152 may be maintained in position.

The connector plate 154 has a first side 160, which is adapted to couple to the second end 110 of the hopper 102, and a second side 162 having a portion that is contoured to correspond with a portion of the powder feed cylinder assembly 152. According to an embodiment, the connector plate 154 may be made of a metal material, such as aluminum or an alloy thereof and is generally square-shaped. In other embodiments, the connector plate 154 may be made of a different material and/or may have a different shape. To maintain structural integrity of the connector plate 154, the connector plate 154 may have a thickness in a range of from about 0.20 cm to about 0.30 cm. As will be discussed below, the thickness of the connector plate 154 may vary from location to location along certain parts of the plate 154. In any case, the connector plate 154 may be bolted, fastened, or otherwise affixed to the hopper 102. In an embodiment, the connector plate 154 is removably affixed to the hopper 102. In yet other embodiments, the connector plate 154 is permanently affixed to the hopper 102. In an embodiment, the first side 160 is flat and lays flush against the second end 110 of the hopper. In other embodiments, the first side 160 of the connector plate 154 may not be flat and may include ridges, channels, and/or projections on its surface. The second side 162 of the connector plate 154 may be generally flat and may include a groove 157. The groove 157 in the connector plate 154 corresponds with an outer surface shape of the power feed cylinder assembly 152.

In accordance with an embodiment, an aperture 158 is formed through the connector plate 154 extending from the connector plate first side 160 to the second side 162. In an embodiment, the aperture 158 may be located on the connector plate 154 to align with and receive powder from the outlet opening 120. In an embodiment, the aperture 158 is smaller than the outlet opening 120 and may have a diameter in a range of about 0.40 cm to about 0.60 cm. In other examples, the diameter of the aperture 158 may be smaller or larger than the aforementioned range. In other embodiments, the diameter of the aperture 158 may be substantially equal to (e.g., ±0.05 cm) to the diameter of the outlet opening 120. To prevent leakage of powder between the hopper 102 and the connector plate 154, a seal 164 may be included. In an embodiment, the seal 164 may be disposed in a groove formed on the second end 110 of the hopper 102. In any case, the seal 164 may be located around the aperture 158. In an embodiment, the seal may be an O-ring, or other type of seal.

The housing block 156 is attached to the hopper 102 via the connector plate 154 and includes various channels for dispensing powder received from the powder feed cylinder assembly 152. In accordance with an embodiment, the housing block 156 may be bolted, fastened, or otherwise removably attached to the connector plate 154, and hence the hopper 102. For example, one or more bolts or fasteners 155 (four shown in FIG. 2) may be driven through the housing block 156, connector plate 154, and a portion of the hopper 102 to couple the three components to each other. In any case, the housing block 156 comprises a metal material, such as aluminum or an alloy thereof, and may be cube-shaped. In one example, the housing block 156 may have a length in a range of from about 7.1 cm to about 7.6 cm, a width in a range of from about 7.1 cm to about 7.6, and a height in a range of from about 4.8 cm to about 5.1 cm. In other embodiments, the housing block 156 may be made of other materials, such as aluminum or another material, and/or may have dimensions that are larger or smaller than the aforementioned dimensional ranges.

Generally, the housing block 156 includes a first side 166 that traps the powder feed cylinder assembly 152 against the second side 162 of the connector plate 154. In an embodiment, the first side 166 may include a groove 167 that corresponds with an outer surface of the powder feed cylinder assembly 152 to accommodate the powder feed cylinder assembly 152 therein. Returning to FIG. 1, the housing block 156 may also include a dispenser bore 170 and a powder feed adjustment bore 172. The dispenser bore 170 and the powder feed adjustment bore 172 may extend from designated locations on the first side 166 of the housing block 156 to a second side 174 of the housing block 156. According to an embodiment, the bores 170, 172 are spaced a particular distance apart from each other, and the distance correspond with a distance between feed channels 208, 210 in the powder feed cylinder assembly 152 to allow the bores 170, 172 and respective feed channels 208, 210 to be substantially aligned with each other, as will be described in more detail below. In one embodiment, the dispenser bore 170 may have a diameter that is in a range of from about 0.40 cm to about 0.55 cm. In other embodiments, the dispenser bore 170 may have a diameter that is smaller or greater than the aforementioned range. Although the dispenser bore 170 is shown in FIG. 1 as having a substantially uniform diameter along its length, in other embodiments, the diameter of the dispenser bore 170 may vary.

With continued reference to FIG. 2, an outlet 176 of the dispenser bore 170 may be adapted to accommodate funnel 178. The funnel 178 may be included to improve control over the manner by which the powder is dispensed onto the desired surface. In an embodiment, the funnel 178 may include an insertion end 180 having an outer diameter that is suitable for being received into the outlet 176 of the dispenser bore 170. Additionally, the funnel 178 may have a dispense nozzle 182 that dispenses the powder to the desired surface. In an embodiment, the dispense nozzle 182 has an exit hole 184 having a diameter that is smaller than a diameter of the dispenser bore outlet 176. For example, the diameter of the exit hole 184 may be in a range of from about 0.20 cm to about 0.30 cm. In other embodiments, the diameter may be less than or greater than the aforementioned range.

Returning to FIG. 1, the feed adjustment bore 172 is configured to allow a powder feeder operator to remove excess powder that may buildup in the powder feeder 100. In an embodiment, the feed adjustment bore 172 has a diameter that is in a range of from about 0.40 cm to about 0.55 cm; however, in other embodiments, the feed adjustment bore 172 may have a diameter that is smaller or greater than the aforementioned range. Additionally, the feed adjustment bore 172 may have a varying diameter along its length. In other embodiments, the diameter of the feed adjustment bore 172 may be substantially uniform along its length. A dump valve assembly (indicated by dotted box 173 in FIG. 2) may be disposed within and extend through a portion of the housing block 156 perpendicular to the feed adjustment bore 172. The dump valve assembly 173 is adapted to be moved or rotated, for example, between an open position and a closed position so that when in the open position, powder from the powder feed cylinder assembly 152 may flow through the feed adjustment bore 172, and while in the closed position, powder is blocked from entering the feed adjustment bore 172.

Figure 3:
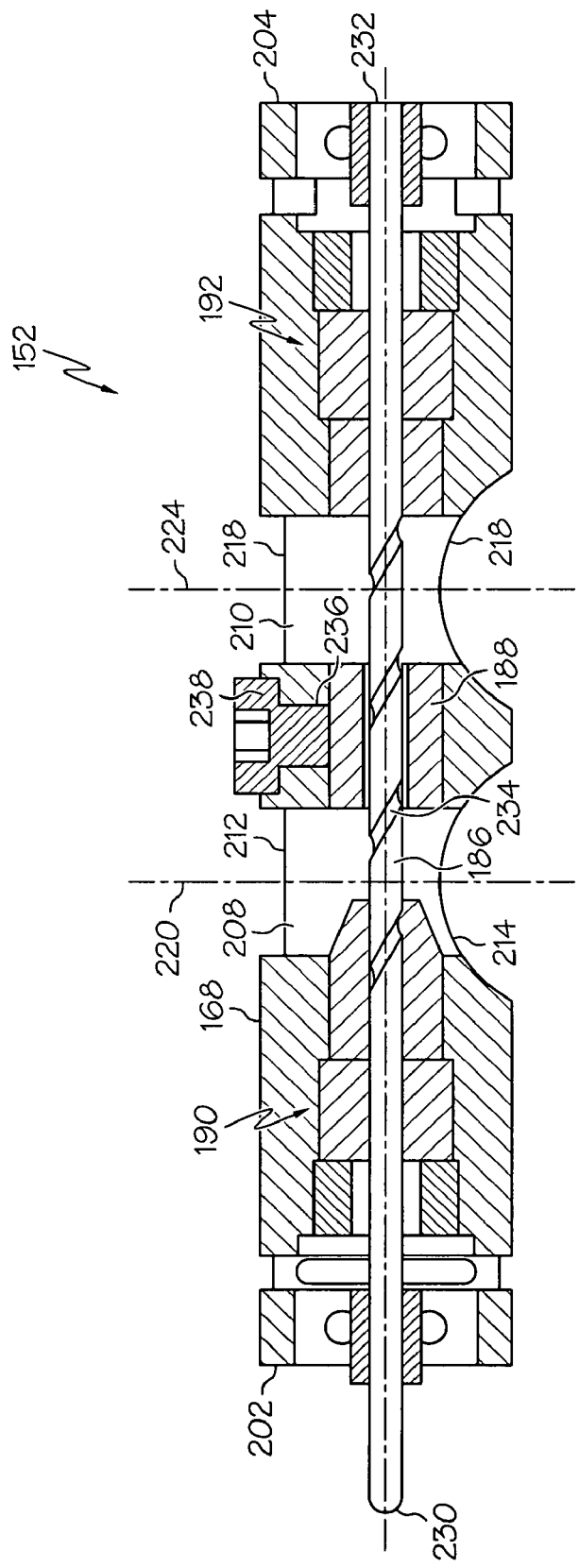
FIG. 3 is a close up, cross-sectional view of the powder feed cylinder assembly included in FIG. 1, according to an embodiment.

The powder feed cylinder assembly 152 is adapted to deliver powder from the hopper 102 to the dispenser bore 170 at a substantially constant and uniform rate. FIG. 3 is a close up, cross-sectional view of the powder feed cylinder assembly 152 included in FIG. 1, according to an embodiment. With reference to FIGS. 1 and 3, the powder feed cylinder assembly 152 includes a cylinder 168, a bit 186, a center bushing 188, and two powder retention assemblies 190, 192. To provide sufficient structural integrity for the powder feed cylinder assembly 152, the cylinder 168 comprises a metal material, such as an aluminum alloy. The cylinder 168 may have a length that is substantially equal to a length of the housing block 156. In another embodiment, the cylinder 168 has a length that is less than the length of the housing block 156. In still another embodiment, the cylinder 168 has a length that is greater than the length of the housing block 156. In any case, the length of the cylinder 168 may be in a range of from about 8.9 cm to about 9.5 cm. In other embodiments, the length of the cylinder 168 may be greater than or less than the aforementioned range. In still another embodiment, the length of cylinder 168 may be substantially equal to a longest distance between the dispenser bore 170 and the feed adjustment bore 172.

Figure 4:
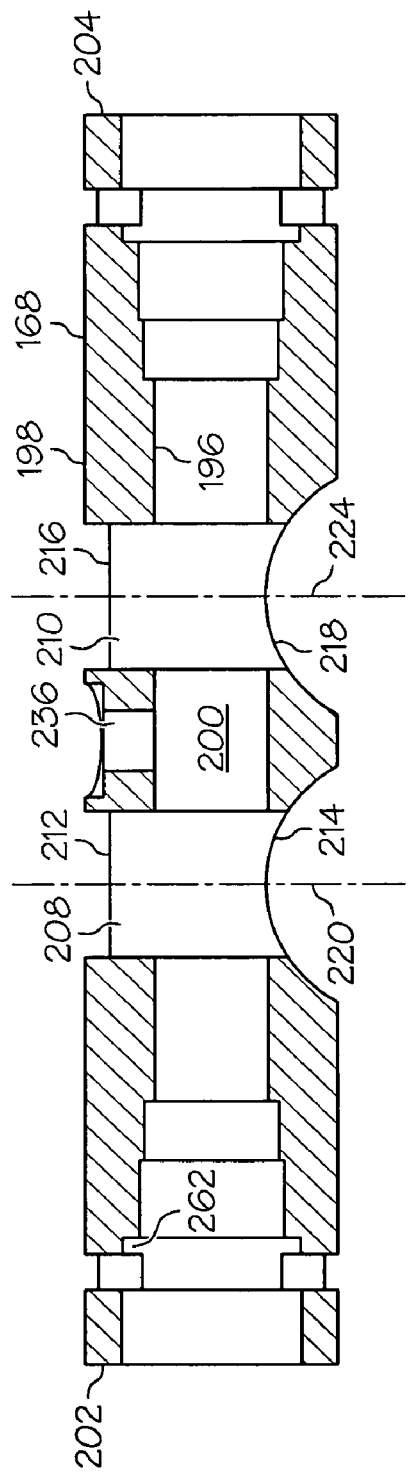
FIG. 4 is a close up, cross-sectional view of the cylinder included in FIG. 3, according to an embodiment.

FIG. 4 is a close up, cross-sectional view of the cylinder 168 included in FIG. 3, according to an embodiment. Referring to FIGS. 3 and 4, the cylinder 168 may have a wall thickness measured between an inner surface 196 and an outer surface 198 that is in a range of about 0.40 cm to about 0.50 cm. In other embodiments, the wall thickness may be greater or less than the aforementioned range. According to an embodiment, the cylinder 168 generally has a main passage 200 that extends between a first end 202 of the cylinder 168 and a second end 204 of the cylinder 168. The main passage 200 is configured to accommodate at least the bit 186, the center bushing 188, and the two powder retention assemblies 190, 192. In a particular embodiment, the inner surface 196 of the cylinder 168 defining the main passage 200 may have a varying contour along its length allowing outer surfaces of at least the center bushing 188 and the two powder retention assemblies 190, 192 to be press fit or otherwise maintained in axial position within the cylinder 168. In an embodiment, a diameter of the main passage 200 may be in a range of from about 0.80 cm to about 0.90 cm. However, in other embodiments, the diameter of the main passage 200 may be greater than or less than the aforementioned range.

The cylinder 168 may also include a first feed channel 208 and a second feed channel 210, each formed radially through the cylinder 168 in communication with the main passage 200. In an embodiment, the first feed channel 208 is located at a first axial location (indicated by dotted line 220 between the first and second ends 202, 204 of the cylinder 168), while the second feed channel 210 is located at a second axial location adjacent to the first axial location (indicated by dotted line 224 between the first and second ends 202, 204 of the cylinder 168). The first and second feed channels 208, 210 are spaced a predetermined distance apart from each other and are positioned to communicate with the feed adjustment bore 172 and the dispenser bore 170, respectively. The predetermined distance, measured from a center of a radial cross-section of the first feed channel 208 to a center of a radial cross-section of the second feed channel 210, may be in a range of from about 2.0 to about 2.1 cm. In other embodiments, the predetermined distance between the feed channels 208, 210 may be greater or less than the aforementioned range. One or both of the feed channels 208, 210 may be configured to include an inlet port 212, 216 and an outlet port 214, 218. Although FIGS. 3 and 4 show both feed channels 208, 210 having inlet ports 212, 216 and outlet ports 214, 218, one feed channel 208, 210 may include both an inlet port and an outlet port, while the other feed channel 208, 210 may include only an outlet port, or vice versa, in other embodiments. In still other embodiments, one feed channel 208, 210 may include an inlet port, while the other feed channel 208, 210 may include an outlet port.

In accordance with an embodiment, the first feed channel 208 is adapted to receive powder flowing from the hopper 102 and through the aperture 158 of the connector plate 154. In this regard, the inlet port 212 of the first feed channel 208 is aligned with the aperture 158 and may be dimensioned to allow powder to flow through. In an embodiment, the inlet port 212 may be substantially equal in diameter to the aperture 158. According to other embodiments, the inlet port 212 may have a largest diameter that is smaller than or larger than the diameter of the aperture 158. For example, the largest opening of the inlet port 212 may have a diameter in a range of from about 1.0 cm to about 1.1 cm. The inlet port 212 may be square-shaped, circular, ovular, rectangular, or may have another suitable shape that may correspond with the shape of the aperture 158.

Powder received through the inlet port 212 may flow through the main passage 200 and either to the outlet port 214 of the first feed channel 208 or to the second feed channel 210. In an embodiment, the outlet port 214 is located on the cylinder 168 opposite from the inlet port 212. The outlet port 214 may have a diameter that is greater than a diameter of the first feed channel 208, in an embodiment. For example, the outlet port 214 may have an opening with a diameter in a range of from about 1.0 cm to about 1.1 cm. In another embodiment, the outlet port 214 may have a diameter that is substantially equal to that of the first feed channel 208. No matter the particular diameter, the outlet port 214 provides communication between the first feed channel 208 and the feed adjustment bore 172 to allow excess powder that builds up in the main passage 200 to be extracted out of the powder feeder 100 through the feed adjustment bore 172. The outlet port 218 of the second feed channel 210 provides a path for powder from the first feed channel 208 to be dispensed into the dispense bore 170. In an embodiment, the outlet port 218 of the second feed channel 210 may have a diameter that is greater than a diameter of the second feed channel 210. For example, the outlet port 218 may have an opening with a diameter in a range of from about 1.0 cm to about 1.1 cm. In another embodiment, the outlet port 218 may have a diameter that is substantially equal to that of the second feed channel 210.

In some embodiments, in which ease of assembly is desired, the cylinder 154 may be formed such that the first and the second feed channels 208, 210 are substantially identically configured so that either feed channel 208, 210 may be used to communicate with the dispenser bore 170 or the feed adjustment bore 172. Thus, the inlet ports 212, 216 are substantially identical to each other, and the outlet ports 214, 218 are substantially identical to each other. In such case, when the cylinder 154 is incorporated into the powder feed cylinder assembly 152, one inlet port, for example, inlet port 216 of the second feed channel 210 may be sealed with a stopper 222 (FIG. 1), to prevent leakage of powder out of the inlet port 216.

With continued reference to FIG. 3, the bit 186 extends through the cylinder 154, and in particular, through the main passage 200. In an embodiment, the bit 186 is made of a material that is substantially wear-resistant when exposed to various types of powder particles. For example, the bit 186 may comprise steel, or another nickel-based alloy, a cobalt-based alloy, or another similar type of material. The bit 186 has a first end 230 and a second end 232. When disposed in the main passage 200, the first end 230 of the bit 186 may extend a first length beyond the first end 202 of the cylinder 168 and may be adapted to coupled to a drill bit coupling 260 (FIGS. 1 and 2) that may be used to couple the bit 186 to a motor (not shown), and the second end 232 of the bit 186 may extend a second length beyond the second end 204 of the cylinder 168. In an embodiment, the second length is preferably less than the first length, however in other embodiments, the lengths may be equal or the second length may be greater than the first length. In an embodiment, the bit 186 may have a length in a range of about 3.5 cm to about 4.0 cm. In other embodiments, the bit 186 may be longer or shorter.

In accordance with an embodiment, the bit 186 may be configured to drive powder received from the inlet port 212 of the first feed channel 208 to the outlet port 218 of the second feed channel 210. In this regard, the bit 186 may include a helical channel 234 formed on its outer surface. The helical channel 234 may be configured to extend at least between the first axial location 220 and the second axial location 224, according to an embodiment. In an exemplary embodiment, the helical channel 234 extends from the first axial location 220 to the second axial location 224. In another embodiment, the helical channel 234 extends from a point outside of the first and second axial locations 220, 224 toward one of the first or second axial locations 220, 224. The helical channel 234 may make three and a half turns around a circumference of the bit 186, in an embodiment. In another embodiment, the helical channel 234 may include more or fewer full and/or half turns. According to an embodiment, the helical channel 234 may have a substantially uniform (e.g., ±0.005 cm) channel width that is in a range from about 0.092 cm to about 0.098 cm. In other embodiments, the channel width may be wider or narrower.

Figure 5:
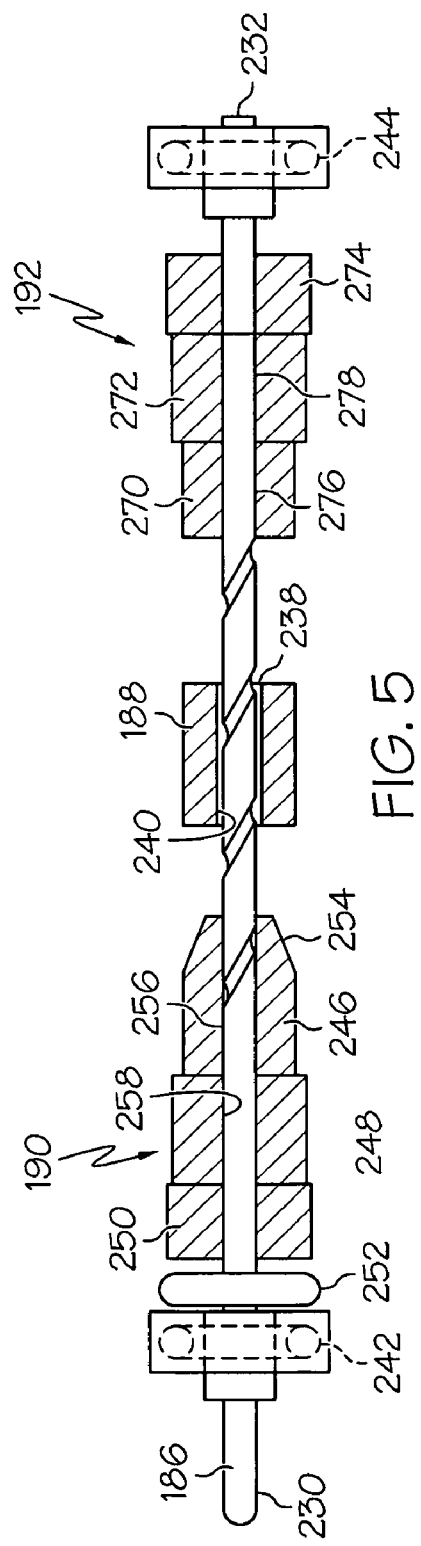
FIG. 5 is a close up, cross-sectional view of various components of the powder feed cylinder assembly included in FIG. 1, according to an embodiment.

With additional reference to FIG. 5, which is a close up, cross-sectional view of various components of the powder feed cylinder assembly 152 included in FIG. 1, to improve an ability of the powder feed cylinder assembly 152 to deliver the powder at a constant rate, the center bushing 188 is disposed in the cylinder 168 between the first and second axial locations 220, 224, and more particularly, between the inlet port 212 of the first feed channel 208 and the outlet port 218 of the second feed channel 210. In accordance with an embodiment, the center bushing 188 is made of a material that is capable of maintaining structural integrity when exposed to the powder. Examples of suitable materials include, but are not limited to carbide or an equivalent material. The center bushing 188 may have a length in a range of from about 0.35 cm to about 0.40 cm, in an embodiment. In another embodiment, the center bushing 188 may have a length of about 0.375 cm. In yet other embodiments, the center bushing 188 may have a longer or shorter length, and the length may depend on the distance between the first and second feed channels 208, 210. The center bushing 188 may be press fit into the cylinder 168 to maintain axial position within the main passage 200. In this regard, the center bushing 188 may have an outer diameter that is slightly less (e.g., 0.001 cm less) than the diameter of the main passage 200. In an embodiment, the outer diameter of the center bushing 188 is in a range of from about 0.25 cm to about 0.35 cm. In other embodiments, the outer diameter is smaller than the aforementioned range. In such case, an annular shim (not shown) or other component may be included between the center bushing 188 and the cylinder 168 to fix the center bushing 188 at an axial position within the main passage 200. In yet another embodiment, a bolt 228 may be driven through an opening 236 in the cylinder 168 to maintain the center bushing 188 at its axial position. In another embodiment, the bolt 228 may not be included.

According to an embodiment, the center bushing 188 has an axially-extending passage 238 through which a portion of the bit 186 extends. The axially-extending passage 238 is defined by an inner surface 240 of the center bushing 188. In an example, the axially-extending passage 238 has a diameter in a range of from about 0.07 cm to about 0.15 cm. In another example, the diameter may be greater or less. The inner surface 240 may be spaced apart from the outer surface of the bit 186 to form a gap, in accordance with an embodiment. The gap may have a width in a range of from about 0.127 mm to about 0.381 mm, in an embodiment. In other embodiments, however, the gap may be extremely small and may be in a range of from about 0.003 to 0.005 cm wide. In any case, the gap is preferably sized to provide sufficient width to allow the bit 186 to rotate within the axially-extending passage 238 of the center bushing 188. The bit 186 is further maintained in axial position during rotation by two bearings 242, 244. In particular, a first bearing 242 is coupled to the bit 186, in particular, between the first end 230 of the bit 186 and the center bushing 188, and the second bearing 244 may be coupled to the second end 232 of the bit 186. In accordance with an embodiment, both the first and second bearings 242, 244 are positioned outside of the cylinder 168; however, in other embodiments, one or both of the bearings 242, 244 may be disposed in the main passage 200 of the cylinder 168.

To maintain the powder within each of the first and second feed channels 208, 210, powder retention assemblies 190, 192 are included. In an embodiment, the first powder retention assembly 190 is disposed in the main passage 200 on a first side of the center bushing 188, spaced apart from both the center bushing 188 and the first end 202 of the cylinder 168 (more specifically, the first bearing 242). According to an embodiment, the first powder retention assembly 190 is adapted to prevent powder from the first feed channel 208 from contaminating the first bearing 242. In this regard, the first powder retention assembly 190 includes a first end bushing 246, a first fitting 248, a first lock socket 250, and a slinger 252. In accordance with an embodiment, the first end bushing 246 is made of a material that is capable of maintaining structural integrity when exposed to the powder. Examples of suitable materials include, but are not limited to steel, a nickel-based alloy, a cobalt-based.

The first end bushing 246 is spaced a predetermined distance apart from the center bushing 188. In one example, the predetermined distance is a distance that allows a desired amount of powder to be maintained in the first feed channel 208 before being transferred into the second feed channel 210. According to an embodiment, the predetermined distance is a width of the first feed channel 208. According to another embodiment, the predetermined distance is greater than a width of the first feed channel 208. In another embodiment, the predetermined distance is less than the width of the first feed channel 208. In any case, the predetermined distance may be in a range of from about 0.60 cm to about 0.80 cm. In other embodiments, the predetermined distance may be greater or less. According to an embodiment, the predetermined distance may depend on a particular shape of the outer surface of the first end bushing 246. For example, the first end bushing 246 may have a total length in a range of from about 0.150 cm to about 0.200 cm, in an embodiment. In other embodiments, the first end bushing 246 may be longer or shorter. In accordance with another embodiment, the first end bushing 246 may have a beveled section 254 formed in its outer surface, such as shown in FIG. 5. In such case, the beveled section 254 may have a length in a range of from about 0.150 cm to about 0.200 cm, in an embodiment. In other embodiments, the beveled section 254 may be longer or shorter. Additionally, the predetermined distance may be measured from an axial location at which the first end bushing 246 and the cylinder 168 contact each other to an end of the center bushing 188 and may be relatively wide.

To maintain the first end bushing 246 in position within the main passage 200, the first end bushing 246 may be press fit into the cylinder 168 to maintain axial position within the main passage 200. In this regard, the first end bushing 246 may have an outer diameter that is slightly less (e.g., 0.001 cm less) than the diameter of the main passage 200. In an embodiment, the outer diameter of the first end bushing 246 is in a range of from about 0.25 cm to about 0.35 cm. In other embodiments, the outer diameter is smaller than the aforementioned range. In such case, an annular shim (not shown) or other component may be included between the first end bushing 246 and the cylinder 168 to fix the first end bushing 246 at an axial position within the main passage 200.

According to an embodiment, the first end bushing 246 has an axially-extending passage 256 through which a portion of the bit 186 extend. The axially-extending passage 256 is defined by an inner surface of the first end bushing 246. In an example, the axially-extending passage 256 has a diameter in a range of from about 0.07 cm to about 0.15 cm. In another example, the diameter may be greater or less. The inner surface of the first end bushing 246 may be spaced apart from the outer surface of the bit 186 to form a gap, in accordance with an embodiment. The gap may have a width in a range of from about 0.127 mm to about 0.381 mm, in an embodiment. In other embodiments, however, the gap may be extremely small and may be in a range of from about 0.003 to 0.005 cm wide. In any case, the gap is preferably sized to provide sufficient width to allow the bit 186 to rotate within the axially-extending passage 256 of the first end bushing 246. In another embodiment, the first end bushing 246 may be mounted to the bit 186. In such case, the outer surface of the first end bushing 246 may be spaced apart from the inner surface of the cylinder 168 to form a press fit.

The first fitting 248 is disposed between the first end bushing 246 and the first lock socket 250 and is adapted to trap particles of the powder that may flow past the first end bushing 246. In an embodiment, the first fitting 248 is made of a porous material suitable for trapping particles, such as a felt material or a fluoropolymer material, such as Teflon® available through E.I. DuPont de Nemours and Company of Dover, Del. In other embodiments, other materials may be employed. In any case, the first fitting 248 may be fitted into the main passage 200 of the cylinder 168 and maintained in an axial position in the cylinder 168. For example, the first fitting 248 may be cylindrically-shaped and may have an outer diameter that is substantially equal to (e.g., ±0.05 cm) a diameter of a corresponding section of the cylinder 168. In another embodiment, the first fitting 248 is comprised of a pliable material and has an outer diameter that is greater than the diameter of the corresponding section of the cylinder 168. In any case, first fitting 248 includes an opening 258 through which a portion of the bit 186 extends, which may have a diameter that is slightly greater than (e.g., 0.001 cm less) the diameter of the bit 186. In an embodiment, the diameter of the opening 258 is in a range of from about 0.25 cm to about 0.35 cm. In other embodiments, the diameter is greater than the aforementioned range. The opening 258 may be sized to allow the bit 186 to rotate therein.

The first lock socket 250 retains the first fitting 248 in position against the first end bushing 246. In an embodiment, the first lock socket 250 is made of a material capable of maintaining structural integrity when the bit 186 is rotating. For example, suitable materials include, but are not limited to steel or brass. According to an embodiment, the first lock socket 250 may be a nut. The first lock socket 250 may be press fit into the cylinder 168 to maintain axial position within the main passage 200. In this regard, the first lock socket 250 may have an outer diameter that is slightly less than (e.g., 0.001 cm less than) the diameter of the main passage 200. In an embodiment, the outer diameter of the first lock socket 250 is in a range of from about 0.25 cm to about 0.35 cm. In other embodiments, the outer diameter is smaller than the aforementioned range. In such case, an annular shim (not shown) or other component may be included between the first lock socket 250 and the cylinder 168 to fix the first lock socket 250 at the axial position within the main passage 200.

For additional protection of the first bearing 242 from powder particles, the slinger 252 is disposed between the first end 230 of the bit 186 and the first end bushing 246. In an embodiment, the slinger 252 is positioned between the first bearing 242 and the first lock socket 250. The slinger 252 may be coupled to the bit 186, such as by brazing, adhesion, with fasteners, or by another coupling manner so that the slinger 252 rotates with the bit 186. In other embodiments, the slinger 252 may remain stationary and thus, may be press fit into the main passage 200. In any case, in an embodiment, the slinger 252 is a radially extending disk that is spaced apart from the first lock socket 250. In accordance with an embodiment, the slinger 252 is positioned a predetermined distance from the first lock socket 250. For example, the predetermined distance may be in a range of from about 0.635 mm about 1.9 mm. In other embodiments, the predetermined distance may be more or less. According to another embodiment, the slinger 252 may be disposed in a section of the cylinder 168 that includes a cutout 262 in its inner surface. The cutout 262 is shaped to accommodate an outer diameter of the slinger 252, which may be larger than an outer diameter of the first lock socket 250. For example, the outer diameter of the slinger 252 may be in a range of from about 0.45 cm to about 0.55 cm. In other embodiments, the outer diameter of the slinger 252 may be greater or less. The slinger 252 may be made of a plastic or other elastomeric material, such as polypropylene or polyoxymethylene plastics, such as Delrin® available through E.I. DuPont de Nemours and Company of Dover, Del., or ultra-high molecular weight (UHMW) polyethylene, according to some embodiments. In other embodiments, the slinger 252 may be made of other materials. The slinger 252 may have a thickness in a range of from about 0.050 cm to about 0.075 cm, according to an embodiment. In other embodiments, the thickness of the slinger 252 may be greater or less than the aforementioned range.

The second powder retention assembly 192 is disposed in the main passage 200 on a second side of the center bushing 188 and is spaced apart from both the center bushing 188 and the second end 232 of the cylinder 168 (more specifically, the second bearing 244). According to an embodiment, the second powder retention assembly 192 is adapted to prevent powder from the second feed channel 210 from contaminating the second bearing 244. In this regard, the second powder retention assembly 192 includes a second end bushing 270, a second fitting 272, and a second lock socket 274. In accordance with an embodiment, the second end bushing 270 is made of a material that is capable of maintaining structural integrity when exposed to the powder. Examples of suitable materials include, but are not limited to steel or cobalt-based alloys.

The second end bushing 270 is spaced a predetermined distance apart from the center bushing 188. In one example, the predetermined distance is a distance that allows a desired amount of powder to be maintained in the second feed channel 210. According to an embodiment, the predetermined distance is a width of the second feed channel 210. According to another embodiment, the predetermined distance is greater than a width of the second feed channel 210. In another embodiment, the predetermined distance is less than the width of the second feed channel 210. In any case, the predetermined distance may be in a range of from about 0.127 mm to about 0.381 mm. In other embodiments, the predetermined distance may be greater or less. According to an embodiment, the second end bushing 270 may have a total length in a range of from about 0.150 cm to about 0.200 cm. In other embodiments, the second end bushing 270 may be longer or shorter.

To maintain the second end bushing 270 in position within the main passage 200, the second end bushing 270 may be press fit into the cylinder 168 to maintain axial position within the main passage 200. In this regard, the second end bushing 270 may have an outer diameter that is slightly less than (e.g., 0.001 cm less than) the diameter of the main passage 200. In an embodiment, the outer diameter of the second end bushing 270 is in a range of from about 0.25 cm to about 0.35 cm. In other embodiments, the outer diameter is smaller than the aforementioned range. In such case, an annular shim (not shown) or other component may be included between the second end bushing 270 and the cylinder 168 to fix the second end bushing 270 at an axial position within the main passage 200.

According to an embodiment, the second end bushing 270 has an axially-extending passage 276 for receiving a portion of the bit 186. The axially-extending passage 276 is defined by an inner surface of the second end bushing 270. In an example, the axially-extending passage 276 has a diameter in a range of from about 0.07 cm to about 0.15 cm. In another example, the diameter may be greater or less. The inner surface of the second end bushing 270 may be spaced apart from the outer surface of the bit 186 to form a gap, in accordance with an embodiment. The gap may have a width in a range of from about 0.127 mm to about 0.381 mm, in an embodiment. In other embodiments, however, the gap may be extremely small and may be in a range of from about 0.003 to 0.005 cm wide. In any case, the gap is preferably sized to provide sufficient width to allow the bit 186 to rotate within the axially-extending passage 276 of the second end bushing 270.

In another embodiment, the second end bushing 270 may be mounted to the bit 186. In such case, the outer surface of the second end bushing 270 may be spaced apart from the inner surface of the cylinder 168 to form a gap. The gap may have a width in a range of from about 0.127 mm to about 0.381 mm, in an embodiment. In other embodiments, however, the gap may be extremely small and may be in a range of from about 0.003 to 0.005 cm wide. In any case, the gap is preferably sized to provide sufficient width to allow the bit 186 to rotate within the main passage 200 of the cylinder 168. In an embodiment, the second end bushing 270 may be made of materials that are similar to the first end bushing 246 and may have dimensions that are substantially similar to the dimensions of the first end bushing 246 described above. In another embodiment, the first and the second end bushings 246, 270 may be made of different materials and/or may have different dimensions.

The second fitting 272 is disposed between the second end bushing 270 and the second lock socket 274 and is adapted to trap particles of the powder that may flow past the second end bushing 270. In an embodiment, the second fitting 272 is made of a porous material suitable for trapping particles, such as a felt material or a fluoropolymer material such as Teflon® available through E.I. DuPont de Nemours and Company of Dover, Del. In other embodiments, other materials may be employed. In any case, the second fitting 272 may be fitted into the main passage 200 of the cylinder 168 and maintained in an axial position in the cylinder 168. For example, the first fitting 248 may be cylindrically-shaped and may have an outer diameter that is substantially equal to (e.g., ±0.05 cm) a diameter of a corresponding section of the cylinder 168. In another embodiment, the second fitting 272 is comprised of a pliable material and has an outer diameter that is greater than the diameter of the corresponding section of the cylinder 168. In any case, the second fitting 272 includes an opening 278 through which a portion of the bit 186 extends, which may have a diameter that is slightly greater than (e.g., 0.001 cm greater than) the diameter of the bit 186. In an embodiment, the diameter of the opening 278 is in a range of from about 0.25 cm to about 0.35 cm. In other embodiments, the diameter is greater than the aforementioned range. The opening 278 may be sized to allow the bit 186 to rotate therein. In an embodiment, the second fitting 272 may be made of materials that are similar to the first fitting 248 and may have dimensions that are substantially similar to the dimensions of the first fitting 248 described above. In another embodiment, the first and the second fittings 248, 272 may be made of different materials and/or may have different dimensions.

The second lock socket 274 retains the second fitting 272 in position against the second end bushing 270. In an embodiment, the second lock socket 274 is made of a material capable of maintaining structural integrity when the bit 186 is rotating. For example, suitable materials include, but are not limited to steel or brass. According to an embodiment, the second lock socket 274 may be a nut. The second lock socket 274 may be press fit into the cylinder 168 to maintain axial position within the main passage 200. In this regard, the second lock socket 274 may have an outer diameter that is slightly less than (e.g., 0.001 cm less than) the diameter of the main passage 200. In an embodiment, the outer diameter of the second lock socket 274 is in a range of from about 0.25 cm to about 0.35 cm. In other embodiments, the outer diameter is smaller than the aforementioned range. In such case, an annular shim (not shown) or other component may be included between the second lock socket 274 and the cylinder 168 to fix the second lock socket 274 at the axial position within the main passage 200. In an embodiment, the second lock socket 274 may be made of materials that are similar to the first lock socket 250 and may have dimensions that are substantially similar to the dimensions of the first lock socket 250 described above. In another embodiment, the first and the second lock sockets 250, 274 may be made of different materials and/or may have different dimensions.

During operation, powder is supplied from the cavity 122 of the hopper 102 to the first feed channel 208. A motor (not shown) rotates the bit 186 and a portion of the powder that is in the first feed channel 208 is driven through the axially-extending passage 238 of the center bushing 188 into the second feed channel 210. In particular, the powder disposed in the helical channel 234 of the bit 186 is carried from the first feed channel 208 to the second feed channel 210. By including the helical channel 234 on the bit 186, the powder is supplied to the second feed channel 210 at a substantially constant rate. After the powder enters the second feed channel 210, it travels along the second feed channel 210 into the dispenser bore 170 from which it dispenses into the funnel 178 and out the exit hole 184 to a repair surface (not shown). In the event that excess powder is to be removed from the powder feeder 100 via the feed adjustment bore 172, the dump valve assembly 173 is moved to an open position to allow powder to flow through the feed adjustment bore 172 and out the outlet port.

Over time, the powder feeder 100 may need to be repaired. For example, the powder feed cylinder assembly 152 may be replaced. Because the powder feed cylinder assembly 154 is configured as a module, it is detachable and can be relatively easily removed. In one embodiment, bolts or fasteners that maintain the housing block 156 and the connector plate 154 together are loosened or removed. As a result, the housing block 156, and hence the powder feed cylinder assembly 152 are detached from the powder feeder 100. In another embodiment, the powder feed cylinder assembly 152 may simply be pulled out of the space formed by the groove (not shown) in the housing block 156 and the groove (not shown) in the connector plate 154. In either embodiment, the powder feed cylinder assembly 152 may then be repaired or replaced. Additionally, repair or replacement may occur in a matter of minutes, as opposed to hours, as is common with traditional powder feeders. For example, it has been found that repair of the above-described powder feeder 100 may be performed in about twenty minutes, in some instances. Hence, embodiments of powder feeders have been provided that include simpler designs than conventional powder feed apparatus. In addition, embodiments of the improved powder feeder are capable of delivering powder at a substantially uniform and/ or constant rate.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A powder feed cylinder assembly, comprising:
a cylinder having a first end, a second end, a main passage, a first feed channel, and a second feed channel, the main passage extending axially through the cylinder, the first feed channel formed radially through the cylinder at a first axial location between the first and the second ends and in communication with the main passage, and the second feed channel formed radially through the cylinder at a second axial location between the first and the second ends and in communication with the main passage;
a bit extending through the main passage and having a first end, a second end, and an outer surface, the outer surface including a helical channel formed on the outer surface of the bit;
a center bushing disposed in the main passage between the first and second axial locations, the center bushing having a first axially-extending passage through which a first portion of the bit extends;
a first end bushing disposed in the main passage and having a second axially-extending passage through which a second portion of the bit extends, the first end bushing disposed on a first side of and spaced apart from the center bushing; and
a second end bushing disposed in the cylinder and having a third axially-extending passage through which a third portion of the bit extends, the second end bushing disposed on a second side of and spaced apart from the center bushing.

2. The powder feed cylinder assembly of claim 1, further comprising:
a slinger disposed in the main passage between the first end of the bit and the first end bushing.

3. The powder feed cylinder assembly of claim 1, further comprising:
a first fitting disposed in the main passage between the first end of the bit and the first end bushing, the first fitting including a first opening through which a fourth portion of the bit extends.

4. The powder feed cylinder assembly of claim 3, further comprising:
a second fitting disposed in the main passage between the second end of the bit and the second end bushing, the second fitting including a second opening through which a fifth portion of the bit extends.

5. The powder feed cylinder assembly of claim 3, wherein the first fitting comprises a felt material.

6. The powder feed cylinder assembly of claim 1, further comprising:
a first bearing coupled to the bit between a first end of the bit and the first end bushing; and
a second bearing coupled to a second end of the bit.

7. The powder feed cylinder assembly of claim 1, further comprising a drill bit coupling coupled to a first end of the bit, the drill bit coupling adapted to be coupled to a motor.

8. The powder feed cylinder assembly of claim 1, wherein the first feed channel has an inlet port and the second feed channel has a first outlet port.

9. The powder feed cylinder assembly of claim 8, wherein the first feed channel has a second outlet port.

10. A powder feed cylinder assembly, comprising:
a cylinder having a first end, a second end, a main passage, a first feed channel, and a second feed channel, the main passage extending axially through the cylinder, the first feed channel formed radially through the cylinder at a first axial location between the first and the second ends and in communication with the main passage, and the second feed channel formed radially through the cylinder at a second axial location between the first and the second ends and in communication with the main passage;
a bit extending through the cylinder and having a first end, a second end, and an outer surface including a helical channel formed on the outer surface;
a center bushing disposed in the main passage between the first and second axial locations, the center bushing having a first axially-extending passage through which a first portion of the bit extends;
a first powder retention assembly disposed in the main passage on a first side of the center bushing between the center bushing and the first end of the cylinder, the first powder retention assembly including:
a first end bushing disposed in the main passage and having a second axially-extending passage through which a second portion of the bit extends, the first end bushing disposed on a first side of and spaced apart from the center bushing, a first fitting disposed in the main passage between the first end of the bit and the first end bushing, the first fitting including a first opening through which a third portion of the bit extends, and a slinger disposed in the main passage between the first end of the bit and the first end bushing; and a second powder retention assembly disposed in the main passage on a second side of the center bushing between the center bushing and the second end of the cylinder, the second powder retention assembly including:

a second end bushing disposed in the main passage and having a third axially-extending passage through which a fourth portion of the bit extends, the second end bushing disposed on a second side of and spaced apart from the center bushing, and a second fitting disposed in the main passage between the second end of the bit and the second end bushing, the second fitting including a second opening through which a fifth portion of the bit extends.

11. The powder feed cylinder assembly of claim 10, wherein the first fitting and the second fitting comprise felt material.

12. The powder feed cylinder assembly of claim 10, further comprising:

a first bearing coupled to the bit between the first end of the bit and the first end bushing; and a second bearing coupled to the second end of the bit.

13. The powder feed cylinder assembly of claim 10, wherein the first feed channel has an inlet port and the second feed channel has a first outlet port.

14. The powder feed cylinder assembly of claim 13, wherein the first feed channel has a second outlet port.

15. The powder feed cylinder assembly of claim 10, wherein the first powder feed cylinder assembly further includes a first lock socket disposed in the main passage between the first fitting and the slinger.

16. The powder feed cylinder assembly of claim 15, wherein the second powder feed cylinder assembly further includes a second lock socket disposed in the main passage between the second fitting and the second end of the bit.

17. A powder feeder, comprising:

a hopper having an outlet;

a powder feed assembly coupled to the hopper, the powder feed assembly including:

a housing assembly including:
  a connector plate coupled to the hopper, and
  a housing block coupled to the connector plate; and a powder feed cylinder assembly disposed between the connector plate and the housing block, the powder feed cylinder assembly including:

a cylinder having a first end, a second end, a first opening, and a second opening, the first opening formed at a first axial location between the first and the second ends and in communication with the outlet of the hopper, and the second opening formed at a second axial location between the first and the second ends, a bit extending through the cylinder and having a first end, a second end, and an outer surface including a helical channel formed on the outer surface, a center bushing disposed in the cylinder between the first and second axial locations, the center bushing having a first axially-extending passage receiving a first portion of the bit, the first axially-extending passage defined by an inner surface spaced apart from the outer surface of the bit to form a gap, a first end bushing disposed in the cylinder and having a second axially-extending passage receiving a second portion of the bit, the first end bushing disposed on a first side of and spaced apart from the center bushing, and a second end bushing disposed in the cylinder and having a third axially-extending passage receiving a third portion of the bit, the second end bushing disposed on a second side of and spaced apart from the center bushing.

18. The powder feeder of claim 17, wherein:

the cylinder includes a first feed channel and a second feed channel, the first feed channel is formed radially through the cylinder at a first axial location between the first and the second ends and is in communication with the main passage, and the second feed channel is formed radially through the cylinder at a second axial location between the first and the second ends and is in communication with the main passage; and the housing block includes a feed adjustment bore and a dispenser bore, the feed adjustment bore communicates with the first feed channel, and the dispenser bore communicates with the second feed channel.

19. The powder feeder of claim 17, wherein the powder feed cylinder assembly further comprises:

a slinger disposed in the main passage of the cylinder between the first end of the bit and the first end bushing.

20. The powder feeder of claim 17, wherein the powder feed cylinder assembly further comprises:

a first bearing coupled to the bit between the first end of the bit and the first end bushing; and a second bearing coupled to the second end of the bit.

* * * * *